United States Patent [19]

Adams et al.

[11] Patent Number: 4,835,373
[45] Date of Patent: May 30, 1989

[54] APPLIANCE FOR TRANSMISSION AND STORAGE OF ENERGY AND INFORMATION IN A CARD-SHAPED DATA CARRIER

[75] Inventors: Jürgen Adams, Villingen-Schwenningen; Manfred Lemke, Brigachtal, both of Fed. Rep. of Germany

[73] Assignee: Mannesmann Kienzle GmbH

[21] Appl. No.: 182,952

[22] Filed: Apr. 18, 1988

[30] Foreign Application Priority Data

Apr. 18, 1987 [DE] Fed. Rep. of Germany ....... 3713251

[51] Int. Cl.$^4$ ............................................. G06K 7/08
[52] U.S. Cl. .................................. 235/451; 235/487; 235/492
[58] Field of Search ........................ 235/451, 487, 492

[56] References Cited

U.S. PATENT DOCUMENTS 4,355,300 10/1982 Weber ................................. 235/451

Primary Examiner—Harold I. Pitts
Attorney, Agent, or Firm—Toren, McGeady & Associates

[57] ABSTRACT

A device for transmission and storage of energy into a mobile data carrier designed in a card-shaped manner, which is insertable into a flute-shaped transmission unit. The transmission unit is designed as a capacitively acting coupling station for energy and information and consists of two flat electrodes spaced from each other, which are embedded into material layers having high dielectric constants. The mobile data carrier also consists of two flat electrodes, arranged in parallel planes with respect to each other, which are coated externally with dielectric material and have therebetween a printed circuit board carrying electronic circuit elements. The mobile data carrier is particularly suitable for application areas involving data acquisition in a motor vehicle branch or in industrial utilization involving rough handling.

18 Claims, 3 Drawing Sheets

APPLIANCE FOR TRANSMISSION AND STORAGE OF ENERGY AND INFORMATION IN A CARD-SHAPED DATA CARRIER

BACKGROUND OF THE INVENTION

1. FIELD OF THE INVENTION:

The invention is directed to an appliance for transmission and storage of energy and information in a mobile data carrier designed to be card-shaped, which is insertable into a chute-shaped transmission unit.

2. DESCRIPTION OF RELATED ART:

Several embodiment forms of mobile data carriers are known, which basically differ in the type of transmission and storage of energy and information. Correspondingly, there exists systems with contacts, as, for instance, the chip card (ISO-card), for serial data transmission through a galvanic connection. Transmissions through plug-in contact means are always fraught with problems, because, due to various circumstances such as contamination, damage and the like, a faulty data transfer and even operational malfunction can arise between the transmission unit and the data carrier. The chip card can therefore be only used in such applications when extremely careful handling and treatment of the chip card is assured.

Data transmission systems are also known for data transfer in mobile data carriers with contacts in parallel arrangement for a bit-parallel and word-serial transmission of the storable data into a so designated memory card. This embodiment form involves, because of the galvanic connection, the same potential sources of error as was the case in the serial transmission.

Mobile data carriers and transmission systems on the basis of inductive coupling are also known, wherein a transmission of the operational energy and data occurs by means of separate coupling coils. A common data/energy transmission on the basis of inductive coupling is also known. Hereby, it is disadvantageous that the data carriers in this case cannot be constructed in an encapsulated form using conducting materials such as steel. The inductive coupling is based upon the functional mode of electromagnetic fields. This coupling is not without problems where the narrow field limitation requires the observance of small tolerances and the positioning of transmission elements with high efficiency. This means, furthermore, that an extremely precise guidance of the card in the transmission chute is required.

Finally, transmission systems and mobile data carriers are known which have a galvanic energy coupling with rugged contacts and which use an inductive functional system for the data coupling.

The necessary precondition applying to the totality of all known installations, is that the user of the data carrier is himself responsible for the extremely careful handling of the data carrier in order to avoid all unintentional operational interruptions. Such disturbances occur in the known installations, for instance, by contact contamination. Data loss can occur because of electromagnetic interference, and finally, mechanical loads, such as deformation or pressing of the data carriers cause many malfunctions.

SUMMARY OF THE INVENTION

It is an object of the invention to provide an appliance for transmission and storage of energy and information and a sturdy, mobile data carrier for receiving same, which avoid the known sources of error and involves as contactless an operation as possible while assuring an extremely simple and non-critical handling.

The above object is achieved in a device for transmission and storage of energy and information in a mobile data carrier designated in a card-shaped manner, which is insertable into a chute-shaped transmission unit wherein the transmission unit is formed as a capacitively effective coupling station for energized information. The transmission unit includes two flat electrodes spaced from each other and embedded in material layers having high relative dielectric constants. The mobile data carrier is insertable between the two flat electrodes of the transmission unit and includes, in the same manner of capacitively effective coupling, two flat electrodes spaced from each other having a dielectric coating around the outside periphery thereof. A printed circuit board having electronic circuit elements thereon is positioned between the flat electrodes and is connected therewith.

In a particular embodiment of the invention, energy, in the form of AC voltage, and data are simultaneously transferred to the data carrier in the form of pulse modulation.

A particular advantage of the indicated solution is seen in the complete encapsulation of the data carrier with completely symmetrical construction, which assures a completely non-problematical handling of the data carrier in that the data carrier is ready to function in any possible insertion position. By possibly metal shielding the data carrier with simple means, for instance, by embedding the data carrier in two half shells of steel, manipulative interventions are eliminated. It follows that in metal shielded embodiments of a data carrier, it is impossible to physically reach the surface electrodes from outside and to perform some sort of changes there by establishing electric contact.

The appliance is distinguished by a high degree of insensivity against electromagnetic interference effects because of the layered structure and the ruggedness of the internal circuitry implied in the type of transmission; this applies particularly to the reception and transmitting circuitry. Magnetic alternating fields are shielded by eddy currents in the surface electrodes. An additional improvement of the shielding is achieved by a ferromagnetically effective metal encasing of the data carrier by half shells of steel. Electrical alternating fields, of the order of magnitude of E, larger than 200 V/cm, in the environment cannot be found. This field intensity with an alternating frequency of f, larger than 100 kHz, are, however, generated in the chute of the coupling station for operation of the data carrier. The receiving and sending circuitry is, however, because of its character, safe to operate up to a multiple of the above-mentioned values, due to conducting away of the offset currents, and with this, an implicit voltage limitation in the circuit.

BRIEF DESCRIPTION OF THE DRAWINGS

An embodiment example is described in the following with particularity with the help of the drawings. It is shown on.

DESCRIPTION OF THE PREFERRED EMBODIMENT

Figure 1:
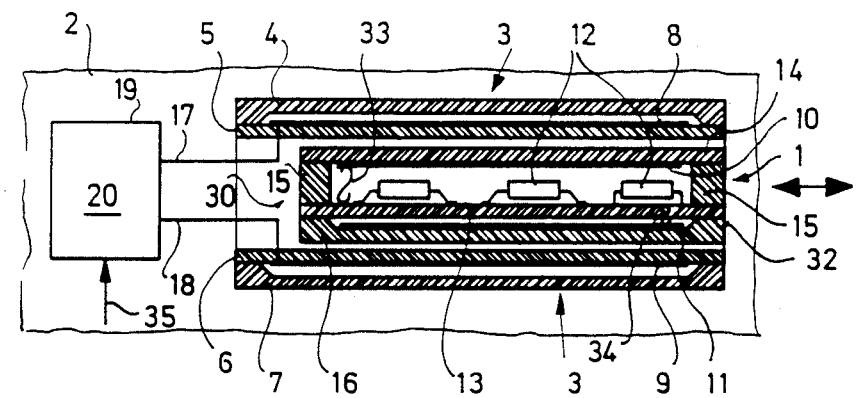
FIG. 1 is a schematic sectional diagram of a mobile data carrier in the chute of the coupling station.

FIG. 1 is a schematic illustration of an appliance for transmission and storage of energy and information in a mobile data carrier 1 designed in a card-shaped manner which is insertable into a chute-shaped transmission unit 2. The transmission unit 2 is designed as a capacitance effective coupling station 3. It consists of two surface electrodes 8, 9 spaced from each other and embedded in material layers 4, 5, 6, 7 having high relative dielectric constants. The space between the surface electrodes 8, 9 forms a chute 30 which has an aperture at one front face 32 of the coupling station 3, into which the card-shaped data carrier 1 is insertable. The surface electrodes 8, 9 of the coupling station 3 are arranged symmetrically with respect to each other. The mobile data carrier 1 consists, in the same way, of capacitively effective surface electrodes 10, 11 covered externally by material layers 14, 15 and 16 and spaced from each other, between which a circuit board 13 carrying electronic circuit elements 12 is arranged, the circuit board 13 being connected with the surface electrodes 10, 11 by means of lines 33, 34. The external material layers 14, 15, 16 of the data carrier 1 represent insulating surfaces with a high relative dielectric constant $\epsilon_r$. The surface electrodes 10, 11 are arranged symmetrically with respect to each other with reference to the external shape of the data carrier 1. This measure imparts the property to the data carrier 1, that it is insertable into the chute-shaped transmission unit 2 independently of a predetermined utilization position, thus also, with the sides interchanged, and that it assures an unlimited ability to function.

Figure 2:
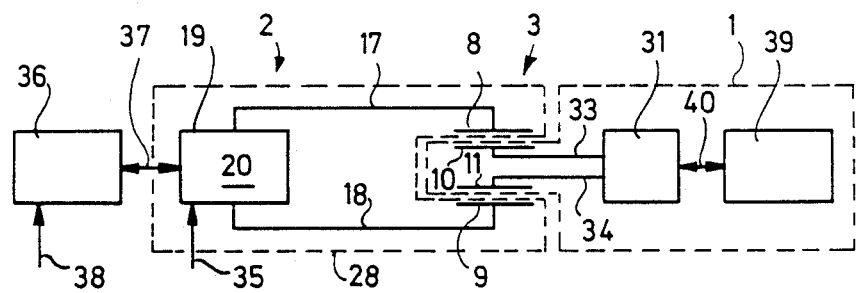
FIG. 2 is an equivalent circuit diagram for the data carrier and transmission unit.

As is shown in FIGS. 1 and 2, the flat electrodes 8 and 9 of the coupling stations 3 are connected through lines 17 and 18 with a driver circuit 19, which serves for making available an operational alternating voltage, which, on its part, causes generation of offset currents in the flat electrodes 8, 9 and 10, 11. Herein, the differing magnitudes of the dielectric constants in the individual material layers 5, 14 and 6, 16 serve for the purpose of a desired increase of the offset currents in the arrangement of the coupling station 3 towards the data carrier during the energy coupling. With the reference to the functional mode here, there results, because of the construction, parasitic capacitances which contribute to losses. The capacitance of the condensers can be affected by the relatively high dielectric constant $\epsilon_r$ in accordance with the equation $C = \epsilon_0 \times \epsilon_r \times A/d$, wherein $\epsilon_0 = 8,855 \times 10^{-12}$ $As$ $V^{-1}$ $m^{-1}$, $\epsilon_r = 1 \ldots n$, A=the surface, d: the plate spacing.

In FIG. 1, a condenser is formed between the electrodes 10 and 11, thus the electrodes of the data carrier 1, in which all the elements, including the carrier substrate of the electronic circuit board 13, represent the dielectric of the condenser. This partial condenser is all the smaller thus less effective, the lower the relative dielectric constant $\epsilon_r$. Compared to this, $\epsilon_r$ should be as large as possible for the material layers which are located between the electrodes 10 or 11 and 8 or 9 for the energy and information coupling.

The offset currents are caused by an alternating voltage of high amplitude or high frequency, which is made available by the driver circuit 19. In the driver circuit 19, switching means 20 are provided which assure an extensively constant current behavior of the shifting current during a half phase of the driving operational alternating voltage. It is expedient in energy coupling to continuously offer an output, so that for the time period in which no output is available, for instance phase transitions of the alternating voltage/the alternating current, terminated differential processes, the energy storage units, so-called buffer condensers are as small as possible. If one attempts to couple the energy by means of a rectangular alternating voltage, then there arises, because of the coupling condensers, differential processes with a timewise short, but high output supply and possibly relatively long intervals referred to a phase of the driving alternating voltage. The high output supply available over a short time leads also to high losses because of the, as a rule high, current share. A continuous output supply can be achieved by a suitably curved shape of the control voltage or by compensation of the reactive impedance $1/\omega C \sim \omega L$, thus the series circuit of an inductive component. The inductive component can be achieved by suitable transformer-coupling circuits or by series circuits of a coil.

A simultaneous input of energy and information into a data carrier 1 is, for instance, achieved by means of frequency modulation of the AC voltage from the driver circuit 19, whereby the AC voltage for the input of energy has a higher and independent frequency as compared to an average frequency for the input of information.

Preferably in this case, a frequency modulation of the driving operational AC voltage from the driver circuit 19 in accordance with a return to zero code is utilized, (return to zero, constant voltage share-free coding).

Figure 6:
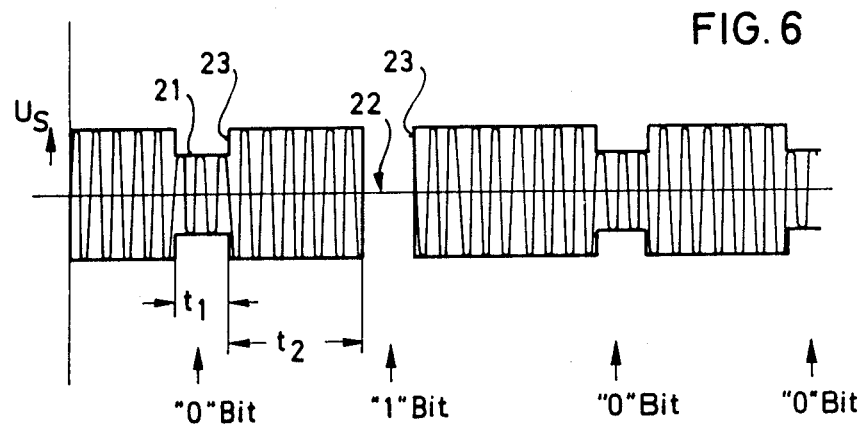
FIG. 6 is a schematic illustration of an amplitude modulation for the combining of signal pulses and information in accordance with the principle of pulse modulation.

In case of a simultaneous input of energy and information by amplitude modulation of the operational AC voltage from the driver circuit 19 which enters the energy, modulation depths of 10% to 100% are utilized for bit coding in such a way that a modulation expandable over 10% to 30% represents bit values of, for instance, "0", and a modulation expandable from 40% to 100% represents bit values of, for instance, "1". In this type of modulation a linkage of signal pulse and information is performable, in such a way that a lowering 21 of the amplitude from 100% to 70% for the time period $t_1$ (see FIG. 6) represents the start of a "0"-bit, a lowering 22 of the amplitude by more than 70% represents the start of a "1"-bit, and the entire amplitude of the operational voltage of the driver circuit 19 for a time period $t_2$ represents a bit end 23.

A simultaneous input of energy into the data carrier 1 and output of information from the data carrier 1 by means of changing the impedance in a receiving- and sending circuit 31 in the data carrier 1 is performable with the device in FIG. 1, in such a way that a bit-information, through changing and overlapping currents and/or voltages, is recognizable and evaluatable by the driver circuit 19. The evaluation can, for instance, occur by recognizing the AC voltage amplitudes between lines 17, 18 in the switching means 20 or by the resulting change in impedance, especially the reactive components (L, C). It is proposed, in a preferred embodiment, to perform the exchange of information between the data carrier 1 and the transmission unit 2 in the half-duplex mode.

It remains to be explained, as far as the equivalent circuit diagram in FIG. 2 is concerned: the transmission unit 2 consists of a coupling station 3 and the driver circuit 19. The flat electrodes 8 and 9 perform the function of coupling condensers and are connected with the driver circuit 19, 20 through the lines 17 and 18. The energy supply of the driver circuit 19, 20 occurs through a feed line 35. A signal connection 37 leads from the driver circuit 19 into a computer logic with an operator's module 36. Computer logic and operator modules 36 are also supplied with energy through a feed line 38.

The flat electrodes 10 and 11 are part of coupling condensers in the data carrier 1 and are connected with the receiving and sending circuit 31 in the data carrier through lines 33 and 34. The receiving and sending circuit 31, as construction group, serves for the preparation and availability of the operational energy in the data carrier 1, for the demodulation of the information signals and finally for the modulation of the impedance at the flat electrodes 8,9 for the data output. A data processing unit 39 with memory (EEROM) and control logic is implemented in the mobile data carrier 1, which processing unit is connected with the receiving and sending circuit 31 through signal and feed connections 40.

Figure 3:
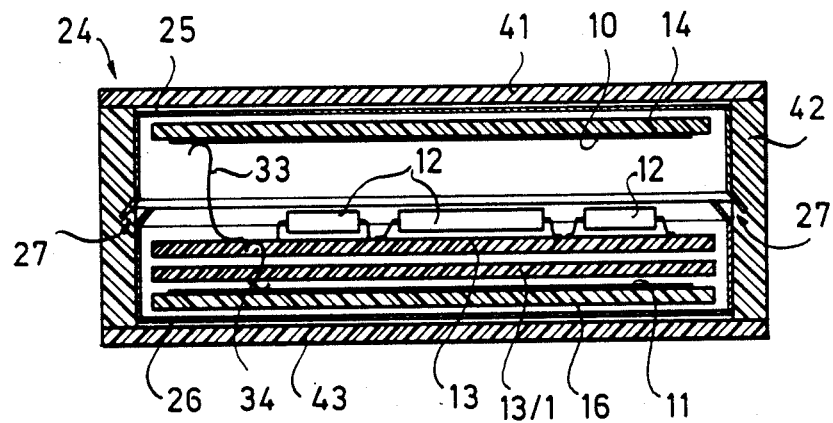
FIG. 3 is a schematic sectional picture of a mobile data carrier metal encased by means of two half shells.

FIG. 3 shows an embodiment form of the mobile data carrier 1, which is embedded into capsule 24 insulated towards the outside and metal clad. The capsule 24 consists of two metal clad half shells 25 and 26 of conducting material, so that the offset currents for the inputting and outputting of energy information are transmittable by electrostatic induction at the flat electrodes 10, 11. The half shells 25, 26 are made of steel and are galvanically separated from each other by a circumferentially insulating separation layer 27. The outer casing of the metal clad mobile data carrier 1 consists also of insulating material layers 41, 42, 43. In the inner space formed by the two half-shells 25 and 26, the data carrier 1 is structured in comparatively the same way as depicted in FIG. 1. In the embodiment depicted in FIG. 3, the structural elements of the data carrier 1 are placed in the inner space formed by the encapsulation 24. From top to bottom there are arranged the dielectric material 14, the flat electrode 10, the electronic circuit elements 12 on the printed circuit board 13 and possibly on a second printed circuit board 13/1, the flat electrode electode 11 and finally the dielectric material layer 16.

Figure 4:
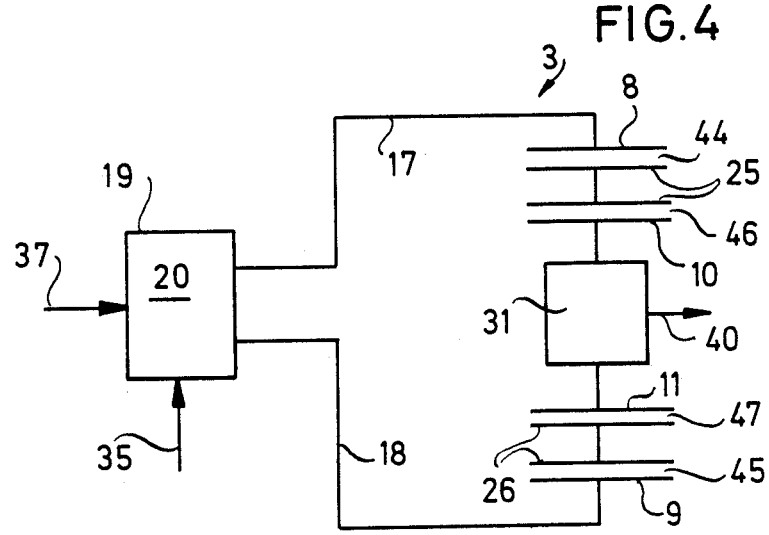
FIG. 4 is an equivalent circuit diagram of the data carrier of FIG. 3 in the coupling station.
Figure 5:
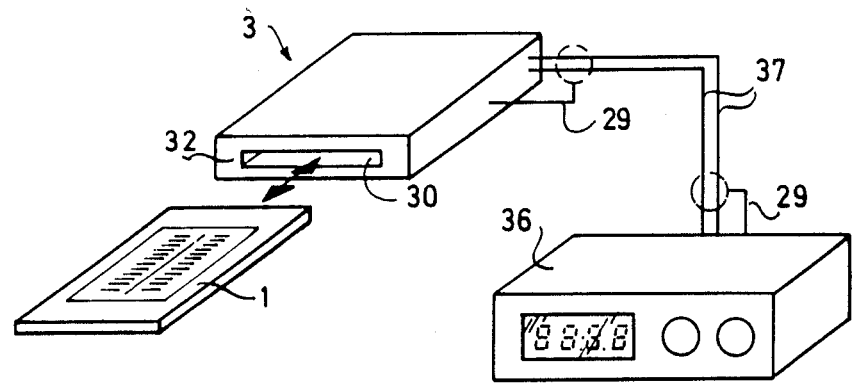
FIG. 5 is a schematic illustration of the appliance for transmission and storage of energy and information in spatially separate arrangement of the coupling station and the computer and operator module.

An equivalent circuit diagram of the data carrier 1 in FIG. 3 in the coupling station 3 is depicted in FIG. 4. According to this, respectively, outer condensers 44, 45 are formed between the flat electrodes 8, 9 in the coupling station 3 and the conducting half shell 25 or 26 and, respectively, inner condensers 46, 47 are formed between the conducting half shells 25 or 26 and the flat electrodes 10 or 11 in the data carrier 1.

A complete encapsulation 24 of the data carrier 1 with a symmetrical construction assures a totally unproblematical handling of the data carrier 1, by providing functional ability of same in every possible insertion position. Because of the metal cladding of the data carrier 1 by embedding it in two half shells 25, 26 of steel plate any manipulative interventions are impossible without leaving traces of the damage or interference. In the metal clad embodiment of the data carrier 1 in FIG. 3, it is thus also impossible to access the flat electrodes 10 and 11 from the outside and to make changes of any sort by contacting any terminal.

What is claimed is:

1. Device for transmission and storage of energy and information in a mobile data carrier 1 designed in a card-shaped manner, which is insertable into a chute-shaped transmission unit, characterized in that the transmission unit is formed as a capacitively effective coupling station 3 for energy and information comprising two flat electrodes spaced from each other and embedded into material layers having high relative dielectric constants, the mobile data carrier is insertable between the embedded flat electrodes and comprises capacitively effective flat electrodes spaced from each other and coated externally a printed circuit board carrying electronic circuit elements is arranged between the flat electrodes and is connected with the flat electrodes.

2. Device according to claim 1, characterized in that the flat electrodes of the data carrier are arranged in symmetrical position with respect to the external shape of the data carrier.

3. Device according to claim 1, characterized in that the flat electrodes of the coupling station are arranged in symmetrical position with respect to each other.

4. Device according to claim 1, 2 or 3, characterized in that the functional position of the data carrier is independent of any predetermined utilization position and that said data carrier is insertable into the chute-shaped transmitting unit in a side interchangeable manner.

5. Device according to claim 1, characterized in that the coupling station is connected through lines with a driver circuit for the preparation and making available of an operational AC voltage, which causes the generation of offset currents in the flat electrodes of both the coupling station and the data carrier.

6. Device according to claim 1, characterized by the utilization of differing magnitudes of dielectric constants in the material layers situated between the coupling station electrodes and the data carrier electrodes for the purpose of a controllable increase of the offset currents between the coupling station and the data carrier for inputting of energy into the data carrier.

7. Device according to claim 1, characterized in that the inputting of energy occurs through offset currents from the transmission unit into the data carrier, which currents are caused by an AC voltage of high, amplitude or high frequency from the driver circuit.

8. Device according to claim 1, characterized in that switching means are provided in the transmission unit which assure an extensively constant current behavior of the offset current during a half-phase of the driving operational AC voltage.

9. Device according to claim 1, characterized by a simultaneous inputting of energy and information into a data carrier by means of frequency modulation of the AC voltage from the driver circuit, wherein the AC voltage for the inputting of energy has a higher and independent frequency with respect to an average frequency for the inputting of information.

10. Device according to claim 1, characterized by a frequency modulation of the driving operational AC voltage from the driver circuit according to an RZ-code.

11. Device according to claim 1, characterized by the simultaneous inputting of energy and information through an amplitude modulation of the operational AC voltage from the driver circuit which is inputting in the energy, wherein modulation depths of 10% to 100% are utilized for bit coding, in such a way that a modulation expandable over 10% to 30% represents bit values of "0" or "1" and a modulation expandable from 40% to 100% represents bit values of "1" or "0", respectively.

12. Device according to claim 10, characterized by a amplitude modulation for the linking of signal pulse and information according to the principle of the modulation, in such a way that a lowering of the amplitude from 100% to 70% for a time period $t_1$ represents the beginning of a "0" bit, a lowering of the amplitude of over 70% represents a bit value of "1" and the entire amplitude of the operational voltage from the driver circuit for a time period $t_2$ represents the bit limit.

13. Device according to claim 1, characterized by a simultaneous inputting of energy into the data carrier and outputting of information from the data carrier by means of changing an impedance in a receiving and sending circuit in the data carrier, in such a way that a bit information is recognizable and evaluatable by changing and superimposed currents and/or voltages from the driver circuit.

14. Device according to claim 1, characterized in that an information exchange between the data carrier and the transmission unit is performed in the half-duplex mode.

15. Device according to claim 1, characterized in that the mobile data carrier is embedded into a metal clad capsule, which consists of two metal clad half shells of conducting material, in such a way that the offset currents for the inputting and outputting of energy information are transmittable to the flat electrodes of the data carrier by electrostatic induction.

16. Device according to claim 15, characterized in that the metal clad capsule consists of half shells of steel, which are galvanically isolated from each other by a surrounding insulating separation strip.

17. Device according to claim 1, characterized in that the coupling station is designed as a construction unit spatially removed from a computer and operator module and preferably consists only of the flat electrodes for the energy and information coupling, said construction unit including an outer housing made of a material with a low dielectric constant and shielding for reducing HF-radiation.

18. Device according to claim 17, characterized in that, because of a presence of a mobile data carrier in the coupling station compared to a circumstance without presence of a mobile data carrier there are generated capacity changes or impedance changes in the coupling station which can be made use of for an additional data processing in the computer and operator module.

* * * * *